(12) United States Patent
Strater et al.

(10) Patent No.: US 7,729,357 B2
(45) Date of Patent: *Jun. 1, 2010

(54) METHOD AND APPARATUS FOR ENABLING A NETWORK DEVICE TO ASYNCHRONOUSLY ACCESS A SET TOP BOX IN A WAY THAT CONSERVES NETWORK BANDWIDTH

(75) Inventors: Jay W. Strater, Jamison, PA (US); Thomas J. Doblmaier, North Wales, PA (US)

(73) Assignee: General Instrument Corporation, Horsham, PA (US)

( * ) Notice: Subject to any disclaimer, the term of this patent is extended or adjusted under 35 U.S.C. 154(b) by 560 days.

This patent is subject to a terminal disclaimer.

(21) Appl. No.: 11/558,243

(22) Filed: Nov. 9, 2006

(65) Prior Publication Data

US 2007/0291659 A1    Dec. 20, 2007

Related U.S. Application Data

(63) Continuation-in-part of application No. 11/471,242, filed on Jun. 20, 2006.

(51) Int. Cl.
    *H04L 12/26*    (2006.01)
(52) U.S. Cl. .............. 370/395.4; 370/241.1; 370/395.2; 709/228

(58) Field of Classification Search ......... 370/217–220, 370/221, 222, 241, 241.1, 242–246, 250, 370/252, 389, 395.2, 395.4, 401; 709/223–226, 709/227–229
See application file for complete search history.

(56) References Cited

U.S. PATENT DOCUMENTS

| | | | |
|---|---|---|---|
| 7,460,556 B2 * | 12/2008 | Duggirala et al. | 370/465 |
| 7,483,437 B1 * | 1/2009 | Mohaban | 370/400 |
| 2006/0182141 A1 * | 8/2006 | Duggirala et al. | 370/465 |
| 2007/0233855 A1 * | 10/2007 | Brown et al. | 709/224 |
| 2008/0045277 A1 * | 2/2008 | Plestid et al. | 455/574 |
| 2008/0154913 A1 * | 6/2008 | Kohonen | 707/10 |
| 2008/0159163 A1 * | 7/2008 | Valli | 370/252 |
| 2008/0205288 A1 * | 8/2008 | Herzog | 370/252 |

* cited by examiner

*Primary Examiner*—Donald L Mills
(74) *Attorney, Agent, or Firm*—Stewart M. Wiener (57) ABSTRACT

A method and an apparatus are provided for improving or optimizing the frequency at which the keep-alive messages are sent to a network device (e.g., an Internet service platform) from a set top box (STB) connected to a router or gateway. By improving or optimizing the frequency at which these messages are sent by the STB to the network device, the amount of network bandwidth that is consumed as a result of sending keep-alive messages can be reduced. This allows a network device to remotely and asynchronously access a STB in a very efficient manner in terms of bandwidth consumption.

18 Claims, 7 Drawing Sheets

METHOD AND APPARATUS FOR ENABLING A NETWORK DEVICE TO ASYNCHRONOUSLY ACCESS A SET TOP BOX IN A WAY THAT CONSERVES NETWORK BANDWIDTH

CROSS-REFERENCE TO RELATED APPLICATIONS

This application is a continuation-in-part application of U.S. non-provisional application Ser. No. 11/471,242, filed on Jun. 20, 2006, entitled "METHOD AND APPARATUS FOR ENABLING A NETWORK DEVICE TO REMOTELY ACCESS A REMOTE DEVICE VIA A NETWORK", which is incorporated herein by reference in its entirety.

TECHNICAL FIELD OF THE INVENTION

The invention relates to a way to enable a network device to remotely access a set top box (STB) efficiently in terms of bandwidth consumption.

BACKGROUND OF THE INVENTION

In a communications network, such as the Internet, for example, there is often a need for a network device, such as a server, to be able to remotely access a remote device on the network, such as a STB located in a person's home. In particular, there is a need for Internet Protocol (IP)—enabled STBs (IPSTBs) to be accessible asynchronously (i.e., in real-time) from a service platform (SP) in the Internet. The Internet SP needs to be able to asynchronously access the IPSTB for a number of reasons, including, for example, allowing a remote subscriber operating from a cell phone or personal computer (PC) to obtain immediate access to content on their IPSTB for digital video recorder (DVR) programming, content pull, etc.

Typically, an IPSTB in the home resides behind a router that implements a configuration known as Network Address Translation (NAT). An Internet Service Provider may also impose NAT and firewall functionality in its network to block asynchronous Internet access to a subscriber's IPSTB. The NAT inherently prevents an Internet SP from accessing the IPSTB unless a NAT address binding is established in the router between the Internet SP and the IPSTB. The NAT address binding includes IP address and User Datagram Protocol (UDP) or Transmission Control Protocol (TCP) port mapping between the Internet SP on the Wide Area Network (WAN) side of a router and the IPSTB on the Local Area Network (LAN) side of the router.

A NAT address binding can be established and maintained by a periodic LAN-to-WAN side transmission of "keep-alive" message packets sent from LAN-side IPSTB to the WAN-side Internet SP. The keep-alive messages must exchanged frequently enough to keep the NAT address binding alive. If the exchanges are not sent frequently enough, the NAT IP/port address binding entry timer will timeout, and the Internet SP will not be able to access the IPSTB. This problem is compounded by the fact that different routers may have different timeout values for NAT IP/port address binding entries. Thus, in order to ensure that a NAT entry is kept alive, the keep-alive messages are typically sent more frequently than is absolutely necessary; often as short as the shortest NAT IP/port address binding timeout period. This frequent transmission of keep-alive messages consumes a large amount of network bandwidth when averaged over many IPSTBs sending such messages.

A need exists for a way to allow a network device, such as an Internet SP, for example, to asynchronously access an IPSTB that is efficient in terms of network bandwidth consumption.

DETAILED DESCRIPTION OF AN ILLUSTRATIVE EMBODIMENT

The invention provides a method and an apparatus for improving or optimizing the frequency at which the "keep-alive" messages are transmitted to a network device (e.g., an Internet SP) from an IPSTB connected to the network by a router or gateway. Improving or optimizing the frequency at which these messages are transmitted results in a reduction in the amount of network bandwidth that is consumed by them. Thus, the invention enables a network device to asynchronously access an IPSTB in a way that is very efficient in terms of bandwidth consumption.

The invention is described herein with reference to NAT messages and devices that are in communications over the Internet using TCP/IP or UDP/IP. However, the invention applies equally to other types of messages, networks and protocols. The term "keep-alive message", as that term is used herein, is intended to denote any type of message that is sent from a remote device to a network device for the purpose of allowing the network device to gain and/or maintain access to the remote device through a router, gateway, or similar device. The term "STP", as that term is used herein, is intended to include not only a set top box, but also to include other devices such as, for example, media stations running on PCs or on some other dedicated platform. The invention also applies to STBs and other devices that are not IP-enabled.

Figure 1:
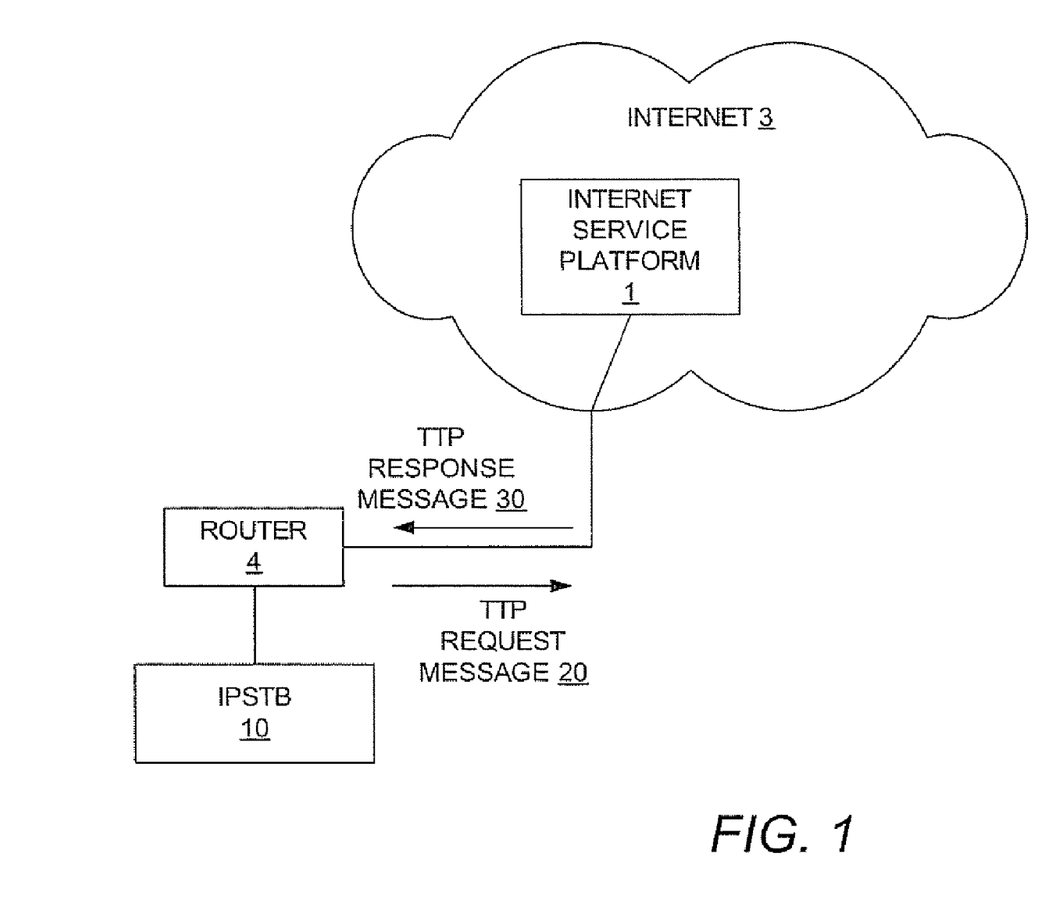
FIG. 1 illustrates a network diagram that demonstrates an example of the manner in which the invention enables an IPSTB to be asynchronously accessed by an Internet SP while conserving network bandwidth.

FIG. 1 illustrates a network diagram that demonstrates an example of the use of the invention to allow a network device 1, such as an Internet SP, for example, to remotely access an IPSTB 10 that is connected to the Internet 3 by a router or gateway 4. The IPSTB 10 may be located at any location including, for example, a user's home. The IPSTB 10 performs a Timing Interval Determination (TID) algorithm that determines a maximum timing interval for exchanging keep-alive messages. When performing this algorithm, the IPSTB 10 sends a Test Time Period Request Message 20 via a router or gateway 4 over the Internet 3 to the network device 1, which is an Internet SP in this example. This message contains a test period value that indicates a time period that is to be tested, which is referred to herein as the "test period". The Internet SP 1 receives the Test Time Period (TTP) Request Message 20 and sets a timer to expire at the end of the test period. When the time period expires, the Internet SP 1 sends a TTP Response Message 30 to the IPSTB 10.

After the IPSTB 10 sends the TTP Request Message 20, it waits and determines whether it has received a TTP Response Message 30. Initially, if the IPSTB 10 does not receive the TTP Response Message 30, the IPSTB 10 decreases the test period value and sends another TTP Request Message 20 that contains the new test period value to the Internet SP 1. The IPSTB 10 waits for a TTP Response Message 30. Each time the IPSTB 10 does not receive a TTP Response Message 30, the IPSTB 10 decreases the test period value and sends a TTP Request Message 20 that contains the new test period value. When the IPSTB 10 receives the TTP Response Message 30, the IPSTB 10 increases the test period value and sends a TTP Request Message 20 that contains the increased test period value to the Internet SP 1. The IPSTB 10 waits for a TTP Response Message 30. Each time the IPSTB 10 receives a TTP Response Message 30, the IPSTB 10 increases the test period value and sends a TTP Request Message 20 that contains the new test period value. When the IPSTB 10 no longer receives the TTP Response Message 30, the IPSTB 10 selects the last test period value to be used as the maximum keep-alive timing interval if this value is within an adequately small value of the failed test period. If not, the IPSTB 10 resumes the process of decreasing the test period and testing for success.

The process is iterative in that the IPSTB 10 continues adjusting the test period value and the TTP Request and Response Messages 20 and 30 are exchanged until the IPSTB 10 determines how frequently these messages need to be sent to keep the aforementioned NAT IP/port address binding entry alive in the router 4. Whenever the IPSTB 10 does not receive a TTP Response Message 30 after sending a TTP Request Message 20, this means that the test period value is longer than the NAT IP/port address binding entry timeout period of the router 4. Therefore, the IPSTB 10 adjusts the test period value until it is just less than the timeout period value of the router 4, and then uses that test period value as the maximum keep-alive timing interval.

Once the maximum keep-alive timing interval has been determined, the IPSTB 10 preferably sends NAT keep-alive messages with a periodicity that is based on this maximum timing interval. Thus, the NAT keep-alive messages preferably are sent as infrequently as possible in order to maximize efficiency and minimize the amount of bandwidth that is consumed as a result of transmitting these messages. However, it is not required that the maximum keep-alive timing interval be used. Some other timing interval that is less than the maximum keep-alive timing interval may be used if desired. The primary goal is to determine how frequently the messages must be sent in order to keep the entry alive, and then use a time period that results in an efficient use of bandwidth.

Figure 2:
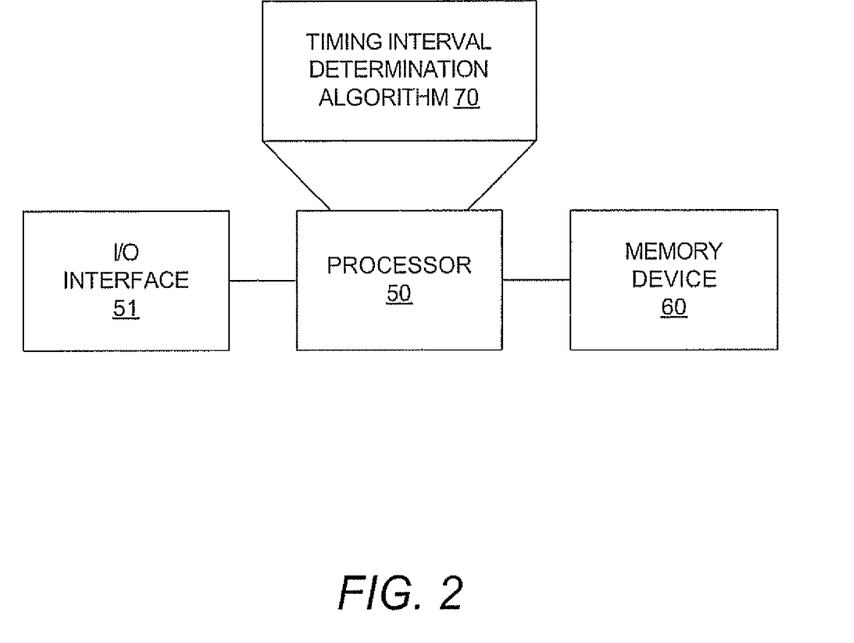
FIG. 2 illustrates a block diagram of a portion of the IPSTB illustrated in FIG. 1 that performs the algorithm of the invention for establishing maximum keep-alive message timing intervals.

FIG. 2 illustrates a block diagram of the apparatus of the invention, which is implemented in the device 10 shown in FIG. 2. The apparatus includes a processor 50, an input/output (I/O) interface 51 and a memory device 60. The processor 50 performs the algorithm 70 of the invention for determining the maximum keep-alive timing interval. The processor 50 sends and receives messages via the I/O interface 51. The I/O interface 51 interfaces with a router or gateway, as described above with reference to FIG. 1. The processor 50 is typically a microprocessor that performs the algorithm by executing a software computer program. However, the processor 50 may be any type of computational device, including, for example, a microprocessor, a microcontroller, a programmable gate array, a programmable logic array, an application specific integrated circuit (ASIC), a system on a chip (SOC), etc.

If the algorithm 70 is implemented in software to be executed by the processor 50, the software program that is used to implement the algorithm 70 may be stored in memory device 60, which may be any type of computer-readable medium, including, for example, random access memory (RAM), dynamic RAM (DRAM), flash memory, read only memory (ROM) compact disk ROM (CD-ROM), digital video disks (DVDs), magnetic disks, magnetic tapes, etc. The invention also encompasses electrical signals modulated on wired and wireless carriers (e.g., electrical conductors, wireless carrier waves, etc.) in packets and in non-packet formats.

Figure 3:
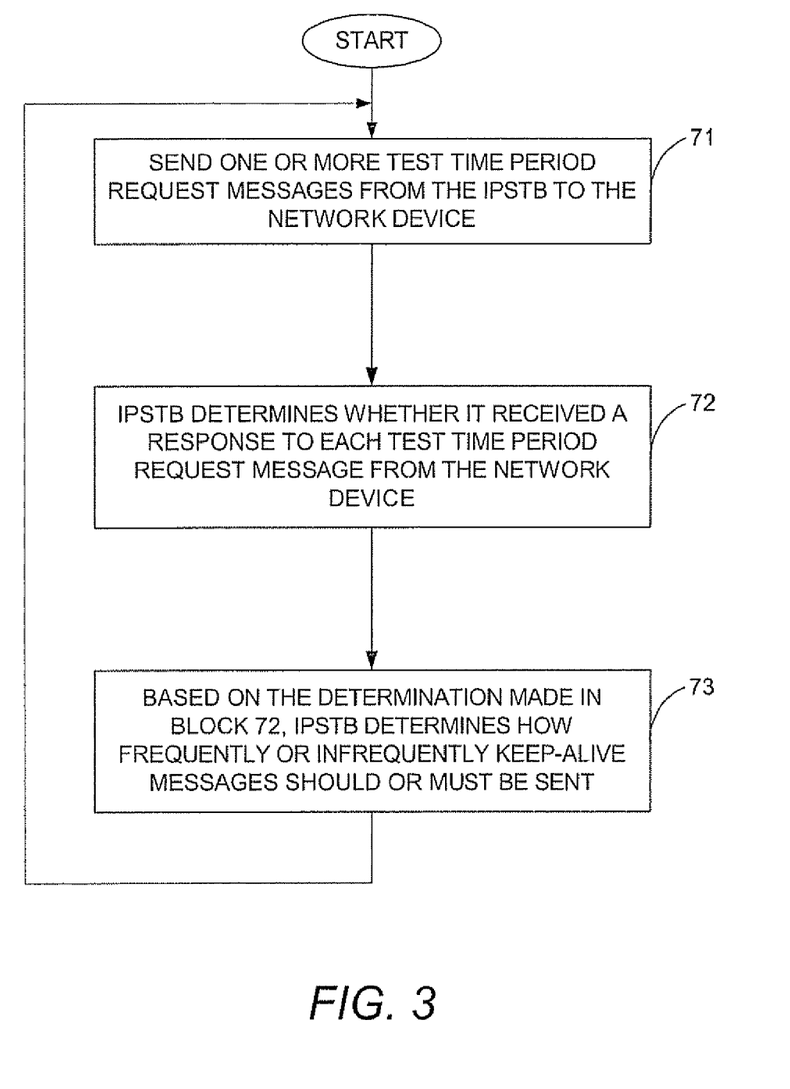
FIG. 3 illustrates a flowchart that demonstrates the method of the invention performed by the IPSTB shown in FIG. 1 in accordance with an illustrative embodiment.

FIG. 3 illustrates a flowchart that demonstrates the method of the invention in accordance with an illustrative embodiment. The IPSTB sends one or more Test Time Period Request Messages to the network device, as indicated by block 71. The IPSTB determines whether it received a Test Time Period Response Message in response to each Test Time Period Request Message sent, as indicated by block 72. Based on the determination represented by block 72, the IPSTB determines how frequently it should or must send keep-alive messages to the network device in order to prevent the NAT IP/port address binding entry timeout period of the router or gateway from expiring, as indicated by block 73. The arrow from block 73 to block 71 is intended to indicate the iterative nature of the process.

In accordance with an embodiment, the processor 50 operates in an optimizing state during which it determines the optimum periodicity for sending keep-alive messages, and in an optimized state during which the processor 50 utilizes the optimum periodicity value for sending keep-alive messages. In the optimizing state, the processor 50 sends keep-alive messages at a less-than-optimal periodicity to the network device 1 via a primary communications port of the IPSTB 10. During this state, the processor 50 sends the TTP Request Message 20 to the network device 1 and receives the TTP Response Message 30 from the network device 1 via a secondary communications port of the IPSTB 10. Once the optimum periodicity has been determined, the processor 50 switches to the optimized state and uses the optimum periodicity on the primary communications port to send keep-alive messages to the network device 1.

Opening a port in a router may create a potential security risk. In order to reduce or eliminate this risk, a port-hopping algorithm can be performed such that the port that is being used in the optimized state changes periodically. The port hopping sequence can be a fixed sequence or a random or pseudorandom sequence, provided the sequence is known or can be ascertained by both the IPSTB and the network device. Each time the port changes, the previous port is closed and the new port is opened. Changing ports in this manner makes it virtually impossible for an unauthorized device to remotely access the remote device via the router.

The algorithm 70 should be performed when the IPSTB is initialized and periodically thereafter due to the fact that network conditions can change (e.g., the subscriber installs a new home router). The test period, of course, is configurable. The IPSTB should also perform the algorithm 70 when the network device (e.g., the Internet SP) instructs the IPSTB to do so. For example, the Internet SP will typically instruct the IPSTB to perform the algorithm after Internet SP discovers that an attempt to communicate with the IPSTB was unsuccessful. In this case, the Internet SP will still be able to communicate with the IPSTB following the reception of a keep-alive message, but only before the expiration of the NAT IP/port address binding timeout period for the router between the Internet SP and the IPSTB.

Figure 4A:
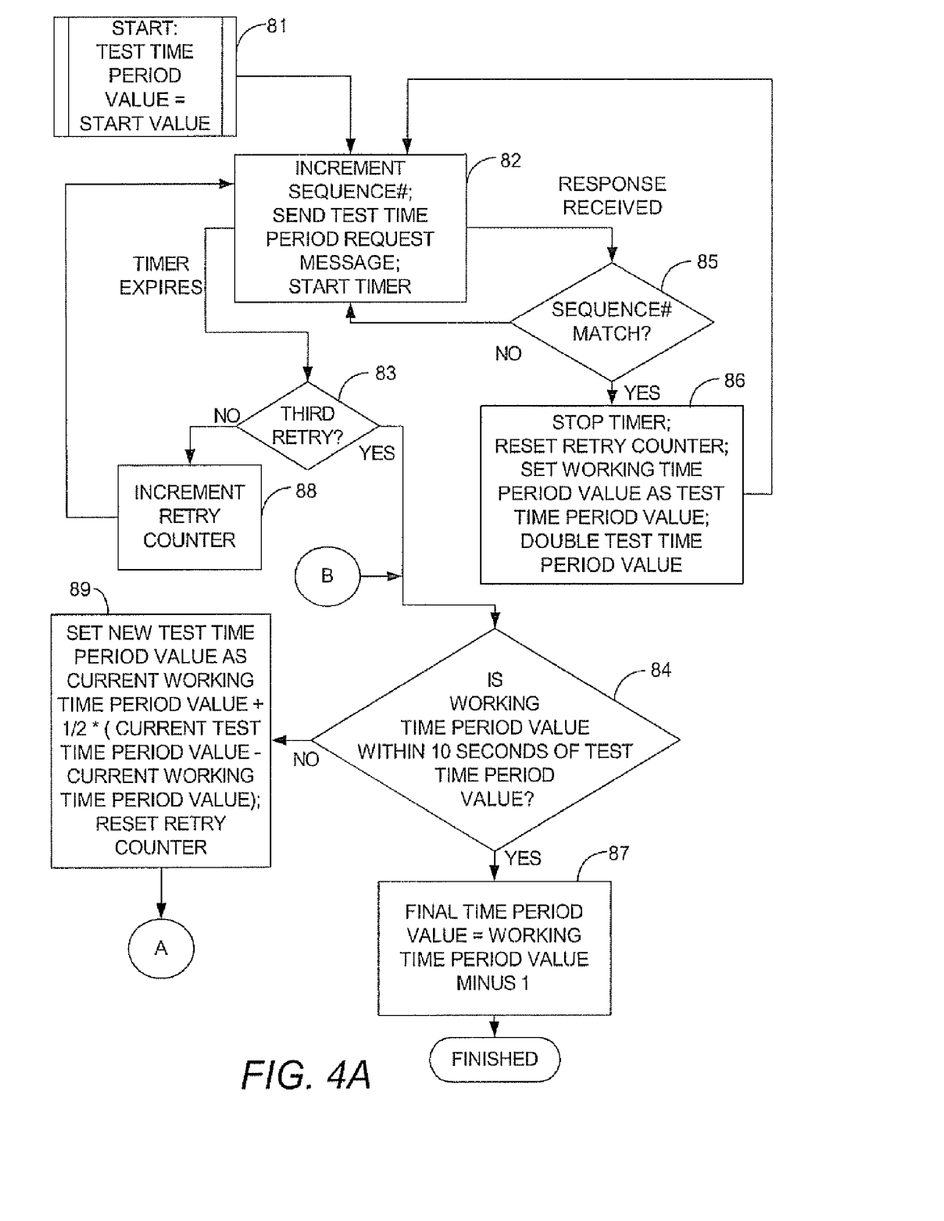
FIGS. 4A and 4B illustrate flowcharts that demonstrate the algorithm of the invention in accordance with one illustrative embodiment performed by the IPSTB shown in FIG. 1.
Figure 4B:
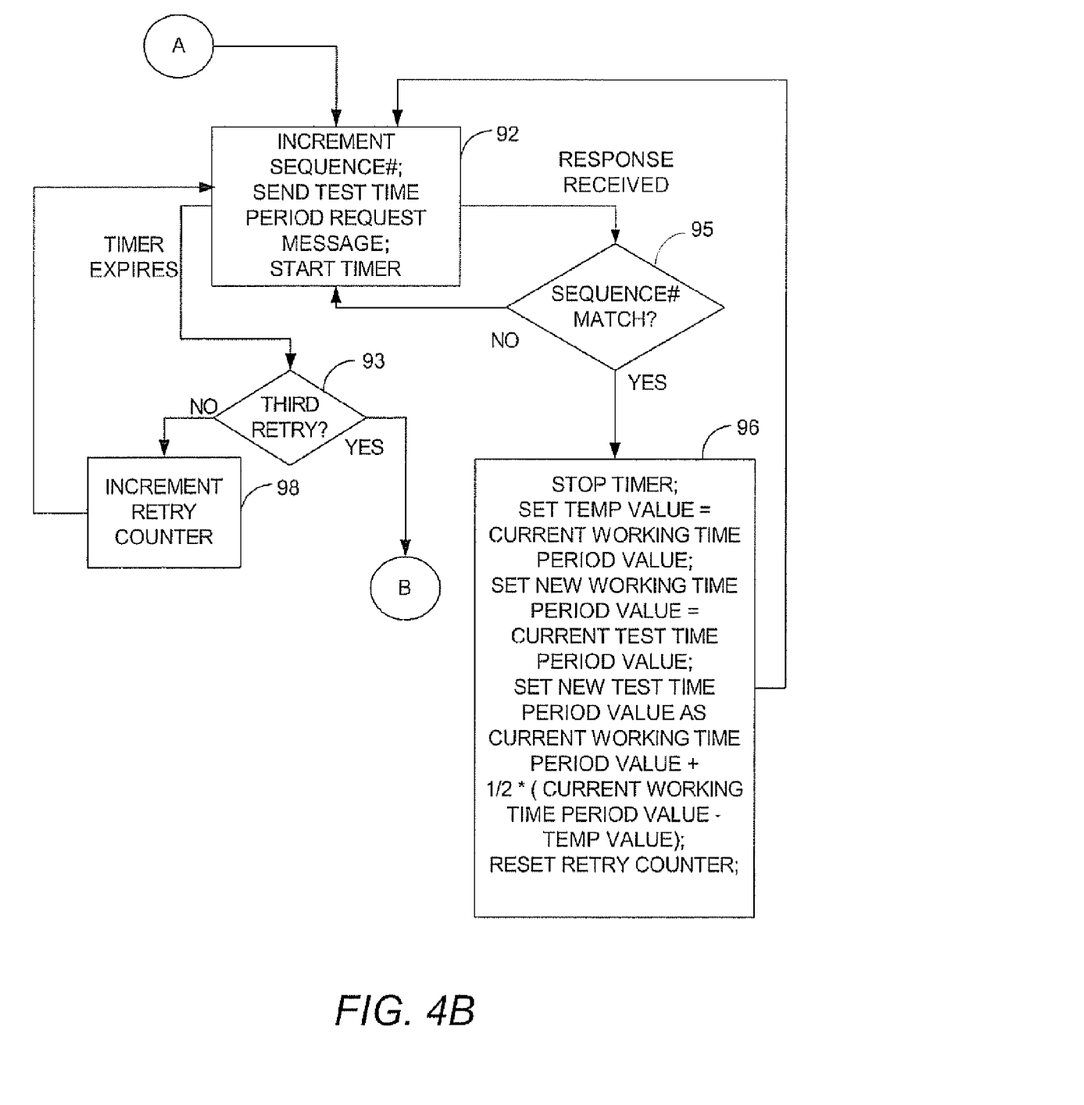

FIGS. 4A and 4B illustrate flowcharts that demonstrate the algorithm of the invention in accordance with one illustrative embodiment. At the start of the algorithm, a Test Time Period value is set to a starting value, as indicated by block 81. This starting value is well below any possible NAT timeout period that may be encountered. The process then proceeds to block 82. A sequence number parameter is set to some initial value and is thereafter incremented during the process. Sequence numbers are used for the NAT messages to allow the IPSTB to associate messages sent by the IPSTB with messages received by the IPSTB. Therefore, each time the IPSTB sends a TTP Request Message, the message includes a new sequence number. The message also includes the Test Time Period value.

When the TTP Request Message is sent by the IPSTB to the network device at block 82, a timer is started. If the timer expires before a TTP Response Message is received by the IPSTB from the network device, the process proceeds to decision block 83. At block 83, a determination is made as to whether the message was sent three times without receiving a response. As stated above, when a TTP Response Message is received by the IPSTB, it is safe to assume that Test Time Period value was shorter than the NAT timeout period of the router. When a response is not received, this means that the NAT IP/port address binding timeout period (referred to hereinafter simply as "NAT timout period") of the router is shorter than the Test Time Period value, or that the response was lost due to some other network issue. In order to ensure that if a response was not received, it was because the Test Time Period value is greater than the NAT timeout period and not due to some other cause, the TTP Request Message is retried multiple times (e.g., 3 times).

When a message has not been retried three times, then a Retry counter is incremented, as indicated by block 88, and the process returns to block 82. The TTP Request Message is sent again, and the timer is started. If no response is received before the timer times out, the process again proceeds to block 83, and a determination is made as to whether the message has been retried for the third time, i.e., whether the retry counter has been incremented to 3. If so, the process proceeds to block 84.

If a TTP Response Message is received before the timer times out, then the process proceeds to block 85. At block 85, a determination is made as to whether the sequence number of the received TTP Response Message matches the sequence number of the TTP Request Message that was sent. If not, the process returns to block 82. If so, the process proceeds to block 86. At block 86, the timer is stopped, the Retry counter is reset, the Test Time Period value is set as twice the current value, and the current Working Time Period value is set as the previous Test Time Period value, i.e., the Test Time Period value before it was doubled. It is not necessary that the Test Time Period value be doubled. This is merely an example of one way of increasing the Test Time Period value to make it closer to the NAT timeout value.

The process then returns to block 82 and the next TTP Request Message is sent that includes the current Test Time Period value (set at block 86) and the timer is started. If the timer reaches the current Test Time Period value before a TTP Response Message is received, the process again proceeds to block 83. If a determination is made that the Retry counter value is equal to 3 (a response was not received after 3 tries), the process proceeds to block 84. At block 84, a determination is made as to whether the current Working Time Period value is within ten seconds of the current Working Test Period value. The purpose of this decision is to determine if the Test Time Period value needs to be adjusted in smaller increments such that the time frame of successful packet exchange changes to a more granular time frame. If a determination is made at block 84 that the current Working Time Period value is within ten seconds of the current Test Time Period value, then a Final Time Period value is set equal to the current Working Test Period minus one, as indicated by block 87. This Final Time Period value is then used to control the frequency of sending keep-alive messages from the IPSTB to the network device.

The current Working Time Period value when the process reaches block 87 is typically anywhere from 0 to 10 seconds below the longest time period that the port on the router will remain open before the NAT timeout period expires causing the router to close the port. Subtracting one from the current Working Time Period value ensures that the traffic will continue circulating, thereby forcing the port to remain open continuously. It is not necessary for this or any particular value to be subtracted from the current Working Time Period value. The value of one is used only for illustrative purposes.

If a determination is made at block 84 that the current Working Time Period value is not within ten seconds of the current Test Time Period value, the process proceeds to block 89. At block 89, a new Test Time Period value is set as the current Working Time Period value plus one-half the difference between previous Test Time Period value and the current Working Time Period value. The Retry counter is reset. The purpose of computing the new Test Time Period value in this way is that it moves the Test Time Period value closer to converging with the NAT timeout period value without going over the NAT timeout period value. For example, assuming that the NAT timeout period is 70 seconds and that when the process reaches block 84 the current Working Time Period value is 40 seconds and the current Test Time Period value is 80 seconds, the new Test Time Period value will be set as: 40 seconds+½(80 seconds−40 seconds)=60 seconds. The process then proceeds to block 92 in FIG. 4B.

Blocks 92, 93, 95, and 98 in FIG. 4B are identical to blocks 82, 83, 85, and 88, respectively, in FIG. 4A. At block 96, the following tasks are performed: the timer is stopped; a Temp value is set as the current Working Time Period value; a new Working Time Period value is set as the current Test Time Period value (set at block 89); a new Test Time Period value is set as the new Working Time Period value plus one-half the difference between the new Working Time Period value and the Temp value; and the Retry counter is reset. The process then continues until a TTP Response Message has not been received after three tries, at which point the process returns to block 84 and continues on in the manner described above with reference to FIG. 4A.

As stated above, the starting value that is used as the Test Time Period value at block 81 in FIG. 4A is well below any possible NAT timeout period that may be encountered in order to ensure that the process will eventually reach block 86 unless there is some other network problem. The invention is not limited to this particular example, as will now be described with reference to FIGS. 5A and 5B.

Figure 5A:
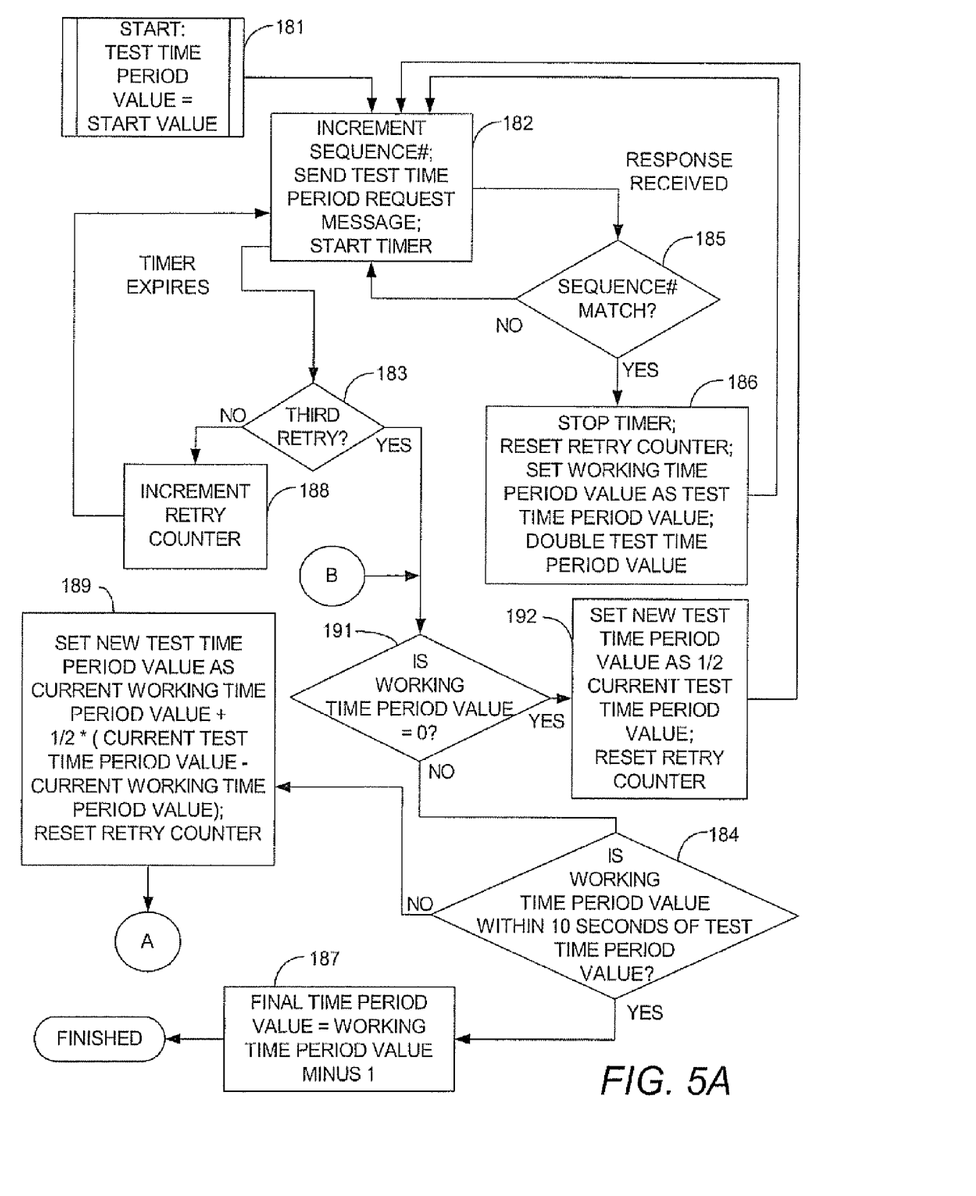
FIGS. 5A and 5B illustrate flowcharts that demonstrate the algorithm of the invention in accordance with another illustrative embodiment performed by the IPSTB shown in FIG. 1.
Figure 5B:
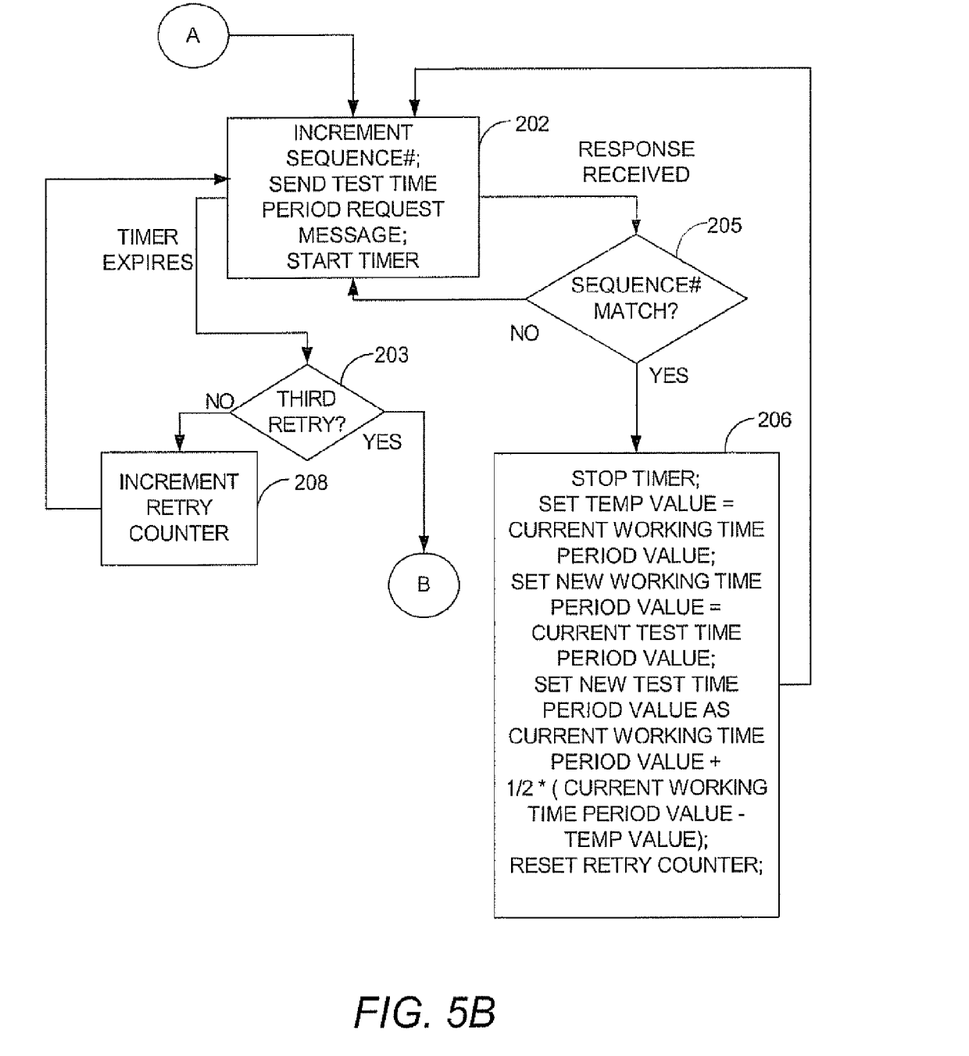

FIGS. 5A and 5B illustrate flowcharts that demonstrate another illustrative embodiment of the method of the invention. In accordance with this embodiment, it is not necessary to initially set the Test Time Period value to a starting value that is below any possible NAT timeout period that may be encountered. The algorithm represented by FIG. 5 allows any starting value to be used as the initial Test Time Period value. Thus, the starting value can be less than, greater than or equal to the NAT timeout period, but typically will be set to a value that is estimated to be close to the nominal NAT timeout period.

At the start of the algorithm, the Test Time Period value is set to some starting value, as indicated by block 181. Blocks 181, 182, 183, 184, 185, 186, 187, 188, and 189 shown in FIG. 5A are identical to blocks 81, 82, 83, 84, 85, 86, 87, 88, and 89, respectively, shown in FIG. 4A. Likewise, blocks 202, 203, 205, 206, and 208 shown in FIG. 5B are identical to blocks 92, 93, 95, 96, and 98, respectively, shown in FIG. 4B. Therefore, in the interest of brevity, the functionality represented by blocks 181-189 and 202-208 will not be described in detail. The functionality represented by blocks 191 and 192 shown in FIG. 5A, however, are not performed by the algorithm described above with reference to FIGS. 4A and 4B. Therefore, the functionality of blocks 191 and 192 will now be described.

At the start of the algorithm represented by FIGS. 5A and 5B, the Work Time Period value is initialized to 0. After the third retry, the process proceeds from block 183 to block 191. At block 191, a determination is made as to whether the Working Time Period value is equal to zero. If so, this means that the process never reached block 186 as a result of the starting value for the Test Time Period being greater than the NAT timeout period of the router. If not, this means that the process reached block 186 at least once, and that the algorithm will proceed to block 184 and continue on in the manner described above with reference to FIGS. 4A and 4B.

If a determination is made at block 191 that the Working Time Period value is equal to zero, the process proceeds to block 192. At block 192, the Test Time Period value is set as a new value that is one-half of the current Test Time Period value, and the Retry counter is rest. The process then proceeds to block 182. As long as the Test Time Period value continues to be larger than the NAT timeout period, the process will continue to return to block 192, at which the Test Time Period value will continue to be halved. After the Test Time Period value has been reduced below the NAT timeout period, the process will eventually proceed from block 182 to block 186. At block 186, the timer is stopped, the Retry counter is reset, the Test Time Period value is set as twice the current value, and the current Working Time Period value is set as the previous Test Time Period value, i.e., the Test Time Period value before it was doubled. The process will then continue on in the manner described above with reference to FIGS. 4A and 4B.

The invention has been described with respect to illustrative embodiments for the purpose of demonstrating the principles and concepts of the invention. Those skilled in the art will understand, in view of the description provided herein, the manner in which modifications can be made to these embodiments and that all such modifications are within the scope of the invention. For example, many modifications can be made to the algorithms described above with reference to FIGS. 4A-5B, and all such modifications are within the scope of the invention.

What is claimed is:

1. An apparatus employed in a set top box (STB) for determining how frequently or infrequently keep-alive messages should be sent between the STB and the network device, the apparatus comprising:

an input/output (I/O) port in communication with a router or gateway device; and a processor in communication with the I/O port, the processor being configured to perform a Timing Interval Determination (TID) algorithm that determines how frequently or infrequently keep-alive messages should or must be sent between the STB and the network device;

wherein when the processor performs the TID algorithm, the processor causes a Test Time Period (TTP) Request Message to be sent via the I/O port through the router or gateway device to a network device, the TTP Request Message including a TTP value that indicates to the network device a TTP that the network device is to wait before responding to the TTP Request Message, and wherein the processor determines whether or not to adjust the TTP value based on whether the processor receives via the I/O port a TTP Response Message from the network device in response to the TTP Request Message.

2. The apparatus of claim 1, wherein if the processor determines that the TTP value is to be adjusted, the processor determines by how much the TTP value is to be adjusted and adjusts the TTP value by the determined amount to obtain an adjusted TTP value.

3. The apparatus of claim 1, wherein if the processor determines that the TTP value is not to be adjusted, the processor uses the TTP value as a Final Time Period value to control how frequently or infrequently keep-alive messages are sent between the STB and the network device.

4. The apparatus of claim 2, wherein if the processor adjusts the TTP value to obtain said adjusted TTP value, the processor causes another TTP Request Message to be sent via the I/O port through the router or gateway device to the network device that includes said adjusted TTP value that indicates to the network device an adjusted TTP that the network device is to wait before responding to the TTP Response Message, wherein the processor determines whether or not to adjust said adjusted TTP value based on whether the processor receives via the I/O port a TTP Response Message from the network device in response to said another TTP Request Message.

5. The apparatus of claim 4, wherein if the processor determines that said adjusted TTP value is to be adjusted, the processor determines by how much said adjusted TTP value is to be adjusted and adjusts the adjusted TTP value by the determined amount.

6. The apparatus of claim 5, wherein if the processor determines that said adjusted TTP value is to be adjusted, the processor causes one or more additional TTP Request Messages to be sent via the I/O port through the router or gateway device to the network device, and wherein the processor causes said adjusted TTP value to continue to be further adjusted until the processor decides that a current TTP value should not be further adjusted and should be used as a Final TTP value, wherein the Final TTP value is used by the STB as a keep-alive message timing interval to control how frequently or infrequently keep-alive messages are sent between the STB and the network device.

7. The apparatus of claim 6, wherein the Final TTP value corresponds to a maximum timing interval that can be used to exchange keep-alive messages between the STB and the network device while ensuring that one or more ports in the router or gateway device remain open to allow the network device to access the STB.

8. The apparatus of claim 1, wherein the TID algorithm determines how frequently or infrequently keep-alive messages should or must be sent between the STB and the network device by determining a maximum timing interval that can be used for sending keep-alive messages to ensure that one or more ports in the router or gateway device remain open to allow the network device to access the STB.

9. The apparatus of claim 1, wherein the STB is an Internet Protocol (IP)-enabled STB.

10. The apparatus of claim 9, wherein the network device is an Internet service platform.

11. The apparatus of claim 1, wherein the router or gateway device uses a Network Address Translation (NAT) configuration, and wherein the keep-alive messages are NAT keep-alive messages that are sent between the STB and the network device to keep a NAT Internet Protocol (IP) IP/port address binding entry alive in the router or gateway device to ensure that the network device is allowed to access the STB.

12. The apparatus of claim 11, wherein the STB and the network device communicate using a Transmission Control Protocol/Internet Protocol (TCP/IP).

13. The apparatus of claim 11, wherein the STB and the network device communicate using a User Datagram Protocol/Internet Protocol (UDP/IP).

14. A method employed in a set top box (STB) for determining how frequently or infrequently keep-alive messages should be sent between the STB and the network device, the method comprising:
    sending one or more Test Time Period (TTP) Request Messages from a STB to a network device, the STB communicating with the network device via a router or gateway device that connects the STB to a network;
    determining whether one or more TTP Response Messages are received by the STB from the network device; and
    based on the determination of whether one or more TTP Response Messages have been received by the STB from the network device, determining how frequently or infrequently keep-alive messages should or must be sent between the STB and the network device;
    wherein the method is performed by a processor that executes a timing interval determination (TID) algorithm, wherein when the processor performs the algorithm the processor causes a TTP Request Message to be sent via an I/O port of the STB through the router or gateway device to the network device, the TTP Request Message including a TTP value that indicates to the network device a time period that the network device is to wait before responding to the TTP Request Message, and wherein the processor determines whether or not to adjust the TTP value based on whether the processor receives via the I/O port a TTP Response Message from the network device in response to the TTP Request Message.

15. The method of claim 14, wherein if the processor determines that the TTP value is to be adjusted, the processor determines by how much the TTP value is to be adjusted and adjusts the TTP value by the determined amount to obtain an adjusted TTP value.

16. The method of claim 14, wherein if the processor determines that the TTP value is not to be adjusted, the processor uses the TTP value as a Final Time Period value to control how frequently or infrequently keep-alive messages are sent between the remote device and the network device.

17. The method of claim 14, wherein the determination of how frequently or infrequently keep-alive messages should or must be sent between the STB and the network device is made by determining a maximum timing interval that can be used for sending keep-alive messages to ensure that one or more ports in the router or gateway device remain open to allow the network device to access the STB.

18. A computer-readable storage medium having stored thereon a computer software program executed by a processor of a set top box (STB) for determining how frequently or infrequently keep-alive messages should be sent between the STB and the network device enabling a network device to remotely access a remote device over a network, the program comprising instructions for execution by the processor, the program comprising:
    instructions for sending one or more lest Time Period (TIP) Request Messages from a STB to a network device, the STB communicating with the network device via a router or gateway device that connects the STB to a network; and
    instructions for determining whether one or more TTP Response Messages are received by the STB from the network device; and
    instructions for determining, based on the determination made as to whether one or more TTP Response Messages have been received by the STB from the network device, how frequently or infrequently keep-alive messages should or must be sent between the STB and the network device;
    wherein the processor executes a timing interval determination (TID) algorithm, wherein when the processor performs the algorithm the processor causes a TTP Request Message to be sent via an I/O port of the STB through the router or gateway device to the network device, the TTP Request Message including a TTP value that indicates to the network device a time period that the network device is to wait before responding to the TTP Request Message, and wherein the processor determines whether or not to adjust the TTP value based on whether the processor receives via the I/O port a TTP Response Message from the network device in response to the TTP Request Message.

* * * * *